United States Patent
Cochran et al.

(10) Patent No.: US 6,944,648 B2
(45) Date of Patent: Sep. 13, 2005

(54) SYSTEM AND METHOD FOR MANAGING TRANSFERABLE RECORDS

(75) Inventors: Jeffrey M. Cochran, Seattle, WA (US); Mark G. Sanders, Snohomish, WA (US); Mir Hajmiragha, Bellevue, WA (US)

(73) Assignee: DocuSign, Inc., Seattle, WA (US)

( * ) Notice: Subject to any disclaimer, the term of this patent is extended or adjusted under 35 U.S.C. 154(b) by 797 days.

(21) Appl. No.: 09/907,732

(22) Filed: Jul. 17, 2001

(65) Prior Publication Data

US 2002/0038318 A1 Mar. 28, 2002

Related U.S. Application Data

(60) Provisional application No. 60/235,510, filed on Sep. 22, 2000.

(51) Int. Cl.[7] ............................................. G06F 13/00
(52) U.S. Cl. ........................ 709/206; 709/219; 707/10
(58) Field of Search ............................... 709/206, 219, 709/217; 707/10, 9, 104

(56) References Cited

U.S. PATENT DOCUMENTS

| | | | |
|---|---|---|---|
| 5,748,738 A | 5/1998 | Bisbee et al. ................. 380/25 |
| 6,085,322 A | 7/2000 | Romney et al. ............. 713/176 |
| 6,119,229 A | 9/2000 | Martinez et al. ............. 713/200 |
| 6,128,740 A | 10/2000 | Curry et al. ................. 713/200 |
| 6,289,460 B1 * | 9/2001 | Hajmiragha ................. 713/200 |
| 6,367,010 B1 * | 4/2002 | Venkatram et al. ......... 713/171 |
| 6,658,403 B1 * | 12/2003 | Kuroda et al. ................. 707/2 |
| 6,796,489 B2 * | 9/2004 | Slater et al. ................. 235/379 |
| 6,807,633 B1 * | 10/2004 | Pavlik ......................... 713/170 |
| 2002/0019937 A1 * | 2/2002 | Edstrom et al. ............. 713/168 |

* cited by examiner

*Primary Examiner*—Viet D. Vu
(74) *Attorney, Agent, or Firm*—Black Lowe & Graham PLLC

(57) ABSTRACT

A system, method, and computer programmed product for generating and transferring electronic documents. The invention includes a document system coupled to a plurality of customer systems over a network. Electronic documents are uploaded and stored to the document system from the customer system. The uploaded electronic documents are designated as a single authoritative copy and as a transferable record. A salt value associated with each uploaded electronic document is generated and stored. A digest associated with each uploaded electronic document is generated and stored using the generated salt value. The digested documents are then transferable from a presently designated holder in due course to a new holder in due course.

12 Claims, 10 Drawing Sheets

DocuTouch

Main Menu
To-Do List

My Documents
Search
Print & Deliver

My Assignments
People

My Account
HELP

Switch Account
Log Off

Powered by CIT

To-Do List

User: Nguyen, Mr. Duc Q
Account: DocuTouch

Tasks

Number of task(s) = 18

Showing Items 1 - 10

| | Document Name | Assigned by | Tasks |
|---|---|---|---|
| | aa.txt | Dunn, Dr. Patrick Francis | |
| | aa.txt | Dunn, Dr. Patrick Francis | |
| | boot.ini | Nguyen, Mr. Duc Q | |
| | boot.ini | Nguyen, Mr. Duc Q | |
| | boot.ini | Nguyen, Mr. Duc Q | |
| | css_gremlin.txt | MingW, Mr. Wong Milton | |
| | Digital1.doc | Cochran, Mr. Jeff M | |
| | DocuTouch Document Repository Design.doc | Nguyen, Mr. Duc Q | |
| | DTSknTag.doc | MingW, Mr. Wong Milton | |
| | DTTagDesign.doc | Nguyen, Mr. Duc Q | |

Show items 11 - 18>>

Document Transfer

| Package | To | From | Due Date | |
|---|---|---|---|---|
| transfer1 | Duc Nguyen | Mr. A | 10-20-2000 | Accept Transfer |
| transfer1 | Mr. A | Duc Nguyen | 10-30-2000 | Transfer Status |

Show next packages>>

Tips

Your "To Do List" displays all the collaborative documents you have uploaded and any documents other contacts have asked you to collaborate on.

Legend
- view
- archive
- approve
- sign
- view signatures
- deliver
- download
- check-in
- check-out
- checkout/checkin status Local Intranet Done

SYSTEM AND METHOD FOR MANAGING TRANSFERABLE RECORDS

PRIORITY CLAIM

This application claims priority from Provisional Application filed Sep. 22, 2000, Ser. No. 60/235,510.

FIELD OF THE INVENTION

This invention relates to electronic document interaction.

BACKGROUND OF THE INVENTION

Paper negotiable instruments and documents (contracts) are unique in the fact that a tangible token, i.e. a piece of paper, actually embodies intangible rights and obligations. A core concept that is not easily transferable into the digital world is that of an "original" for purposes of legal concepts such as "Holder In Due Course," "Presentment" and "Negotiation." The extreme difficulty of creating a unique electronic token or other means which embodies the singular attributes of a negotiable paper document or instrument dictates that the rules relating to negotiable documents and instruments not be simply amended to allow the use of an electronic record for the requisite paper writing. Legal support has now been created for the creation, transferability and enforceability of electronic notes and document equivalents.

Although there exist some systems that attempt to provide for secure document storage and transfer, none present a system that strictly adheres to the new legal support, specifically, identifying and insuring a record is a single authoritative copy and that a record is transferable. Accordingly, there is a need for an electronic document system that strictly meets the present legal support, thereby giving no question to the authenticity of electronic documents.

SUMMARY OF THE INVENTION

The present invention provides a system, method and computer programmed product for generating, identifying and transferring electronic documents. The invention includes a document system coupled to a plurality of customer systems over a network. The document system includes a document upload component, an assigning component, a salting component, and an identifier component. The document upload component uploads and stores an electronic document from one of the customer systems over the network. The assigning component designates the uploaded electronic document as a single authoritative copy and as a transferable record. The salting component generates and stores a salt value (comprised of random bits of data used to introduce randomness) that is associated with the uploaded electronic document. The digesting component generates and stores a digest of the uploaded electronic document using the generated salt value. The identifier component identifies the holder in due course of the uploaded electronic document.

The system further includes a transferring component for transferring the uploaded electronic document to a new holder in due course. The transferring component includes a flag component for flagging the stored document that was endorsed for transfer as a non-single authoritative copy.

The document system further includes an endorsing component, a transmission component, and a verifying component. In a preferred embodiment, the endorsing component endorses the document by the present holder in due course to a new holder in due course. The transmission component sends the endorsed document, the associated stored salt value, and the associated generated digest to the new holder in due course. The verifying component verifies that the sent document is the single authoritative copy based on the associated stored salt value and the associated generated digest. The document upload component uploads and stores a new electronic document to a document system from the new holder in due course. The salting component generates and stores a new salt value that is associated with the newly uploaded electronic document. The digesting component generates and stores a new digest of the newly uploaded electronic document using the generated new salt value.

In another aspect of the present invention, the verifying component generates a digest of the sent document using the sent salt value, and verifies that the sent document is the single authoritative copy by comparing the generated digest to the sent digest.

As will be readily appreciated from the foregoing summary, this invention provides a secure system, method, and computer programmed product for generating, identifying and transferring electronic documents.

BRIEF DESCRIPTION OF THE DRAWINGS

The preferred embodiment of this invention is discussed in detail below with reference to the following drawings.

FIGS. 4–10 are screen shots of example graphical user interfaces presented by the system shown in FIG. 1 for performing the processes of FIGS. 2 and 3.

DETAILED DESCRIPTION OF THE PREFERRED EMBODIMENT

Figure 1:
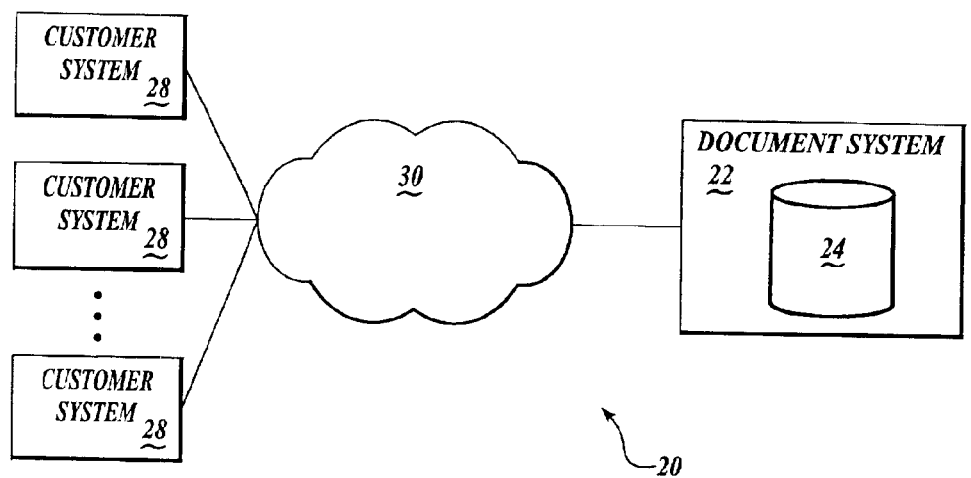
FIG. 1 is a block diagram showing components of the present invention.

The present invention is a system, method, and computer program product for generating, identifying and transferring single authoritative copies of electronic documents. The present invention is preferably implemented as software components that are executed on a networked system, such as system 20 shown in FIG. 1. The present invention may be implemented as stand-alone software components, for example delivered via Application Service Provider (ASP) technology, or integrated into a larger system. System 20 includes a document system 22 coupled to multiple customer systems 28 operated by customers over a public or private network 30. Document system 22 includes a database 24 for storing documents, digital signatures, digital signature certificate information, document related information (such as history), and various other information related to transactions performed on the stored documents.

The connections between the various components of the present invention may be a wireless or non-wireless connection, or a combination of both. Customer system 28 may be a personal computer connected to a network service provider over a public switched telephone network, a cell phone or personal data assistant wirelessly connected to a network service provider or other device that is connectable to network 30.

Figure 2:
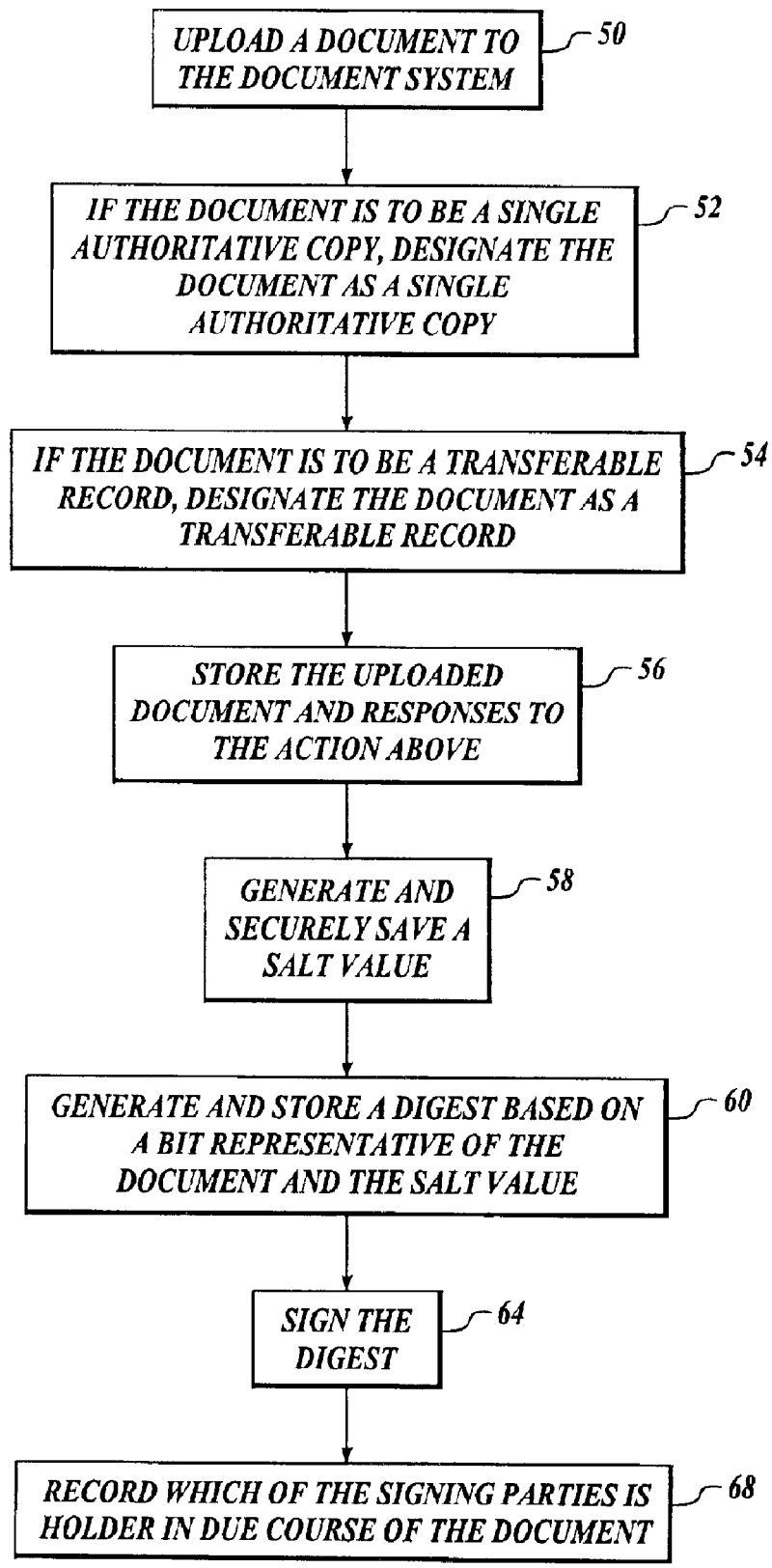
FIG. 2 is a flow diagram illustrating a preferred process for generating a transferable single authoritative copy.

FIG. 2 shows a preferred process performed by system 20. At block 50, a customer uploads an electronic document to document system 22. The type of electronic document to be uploaded may, for example, consist of an electronic record that would qualify as a note under Article 3 of the Uniform Commercial Code or a document under Article 7 of the Uniform Commercial Code if the electronic record were in writing. Preferably, the electronic document identifies some type of financial obligation, such as a home loan. The customer might include a lessor and a lessee who have begun a financial relationship, whereby the document identifies the lessor's ownership interest in a physical entity that the lessee has purchased with the help of a monetary loan supplied by the lessor.

At block 52, the customer designates the document as a single authoritative copy, if the document is to be a single authoritative copy. At block 54, the customer designates the document as a transferable record, if the document is to be a transferable record. At block 56, document system 22 stores the uploaded document in database 24 with information about the responses to the previous actions. At block 58, document system 22 generates and securely saves a salt value, if the document is identified as a single authoritative copy. At block 60, the document system 22 generates and stores a digest based on a bit representation of the document and the salt value. The effect of "salting", i.e., generating a digest using a salt value, effectively "marks" the document as the original and single authoritative copy. Specifically, "salting" is the creation of a unique "salt" value for a particular document or digest. This allows document system 22 to clearly separate the activities that implement negotiable status for the transferable record itself (e.g., digital signatures) and those same activities applied to the plain text defining the transferable record. The salt value is preferably no less than 20 bytes in length and is generated by using a secure algorithm. The salt value is securely stored, separately from the content defining the document (transferable record) and the document itself, to ensure that it cannot be re-associated with the original document.

At block 64, the customer electronically signs the document using customer system 28. Document system 22 applies the signature(s) to the digest based on a digital certificate recorded by the document system 22 or recorded by a system accessible to the document system. At block 68, document system 22 records which of the customers is the present holder in due course of the document.

Figure 3:
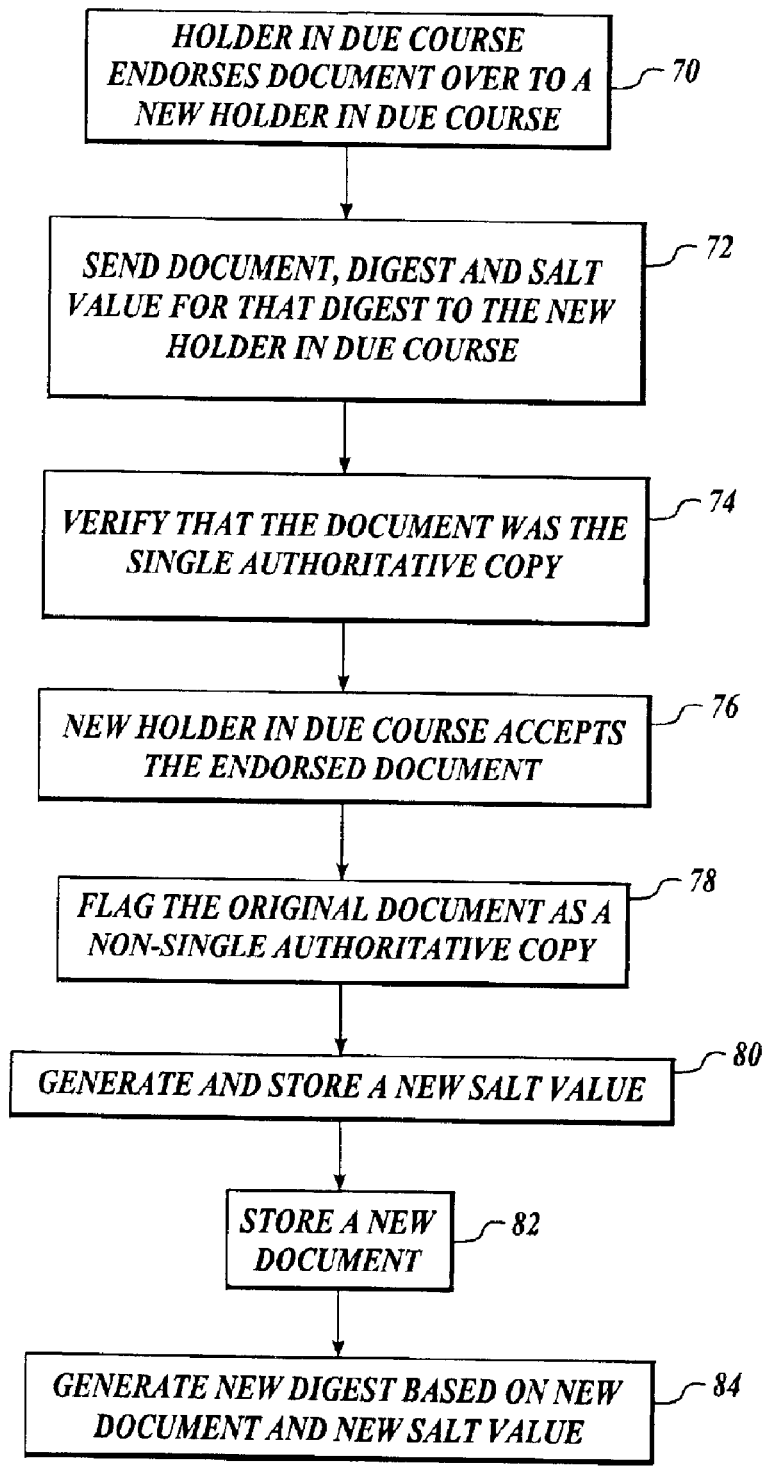
FIG. 3 is a flow diagram illustrating a preferred process for transferring the generated transferable single authoritative copy.

FIG. 3 shows a preferred process performed by system 20 of the present invention for transferring a document previously uploaded and designated as a single authoritative copy and as a transferable record. At block 70, the customer identified as holder in due course endorses the document over to a new holder in due course. The holder in due course is the person considered to be in legal possession of the document. At block 72, document system 22 retrieves the stored document, the signed digest of the document, and the salt value that was used to create the digest, and sends them to the new holder in due course. At block 74, the new holder in due course verifies that the document was the single authoritative copy. The verification is performed by digesting the sent document using the salt value and comparing it to the signed digest. At block 76, the new holder in due course accepts the endorsed document, once the verification is confirmed. At block 78, document server 22 flags the document that is stored as not being a single authoritative copy or transferable record. At block 80, document server 22 generates and stores a new salt value. At block 82, document server 22 receives from the new holder in due course the verified document and stores it as a new document. At block 84, document server 22 generates a new digest based on the newly stored document and the new salt value.

FIGS. 4–10 are screen shots of user interface windows generated by document system 22. These screen shots are viewable by customers that access document system 22 via customer system 28 over network 30. A customer, preferably one with a membership to document system 22, accesses document system 22 by entering a previously approved access code.

Figure 4:
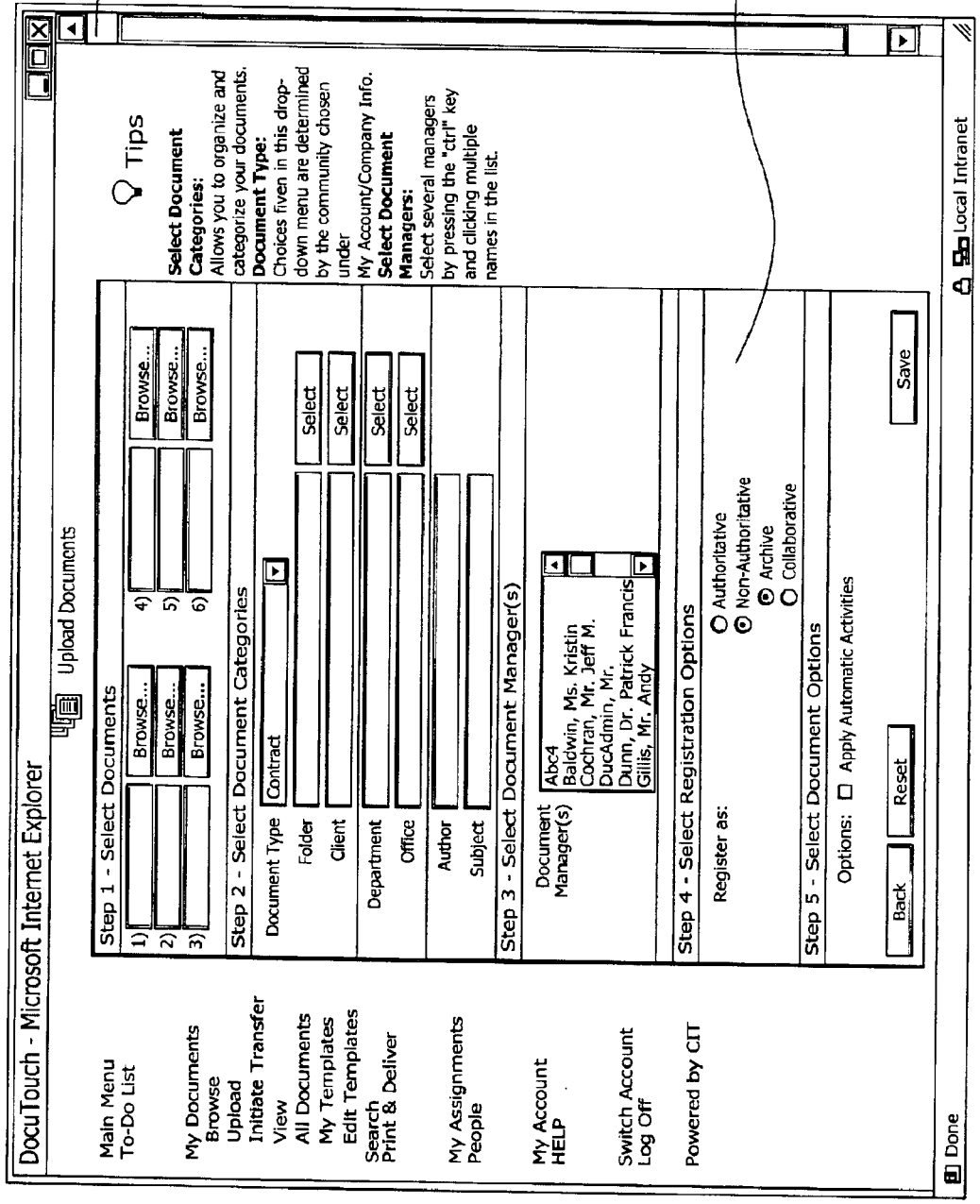

FIG. 4 illustrates an upload window 100 that allows a customer to designate an electronic document that is stored in or accessible by customer system 28. Upload window 100 includes a number of user interface (UI) components that allow a customer to provide various designations for the document that is being uploaded. For example, in UI component 106 of the upload window, the customer has the option of designating the electronic document as a single authoritative copy.

FIG. 5 illustrates an activity window 114 that includes various UI components that identify various activities or tasks that the customer needs to perform on specific documents stored in database 24 of document system 22. A document transfer UI component 118 presents the customer with a list of documents that the customer needs to accept. Document transfer UI component 118 also presents information indicating the due date assigned to each document in the list, and the name of the transferor and the transferee of the associated document. Located in proximity to each document in the list (e.g., along the same row) is one of two different types of UI buttons: an accept transfer button and a transfer status button. When the accept transfer button is activated by the customer, the customer is sent to an accept transfer window (see FIG. 10 below). When the transfer status button is activated, the customer is sent to a transfer status window (see FIG. 9 below).

Figure 6:
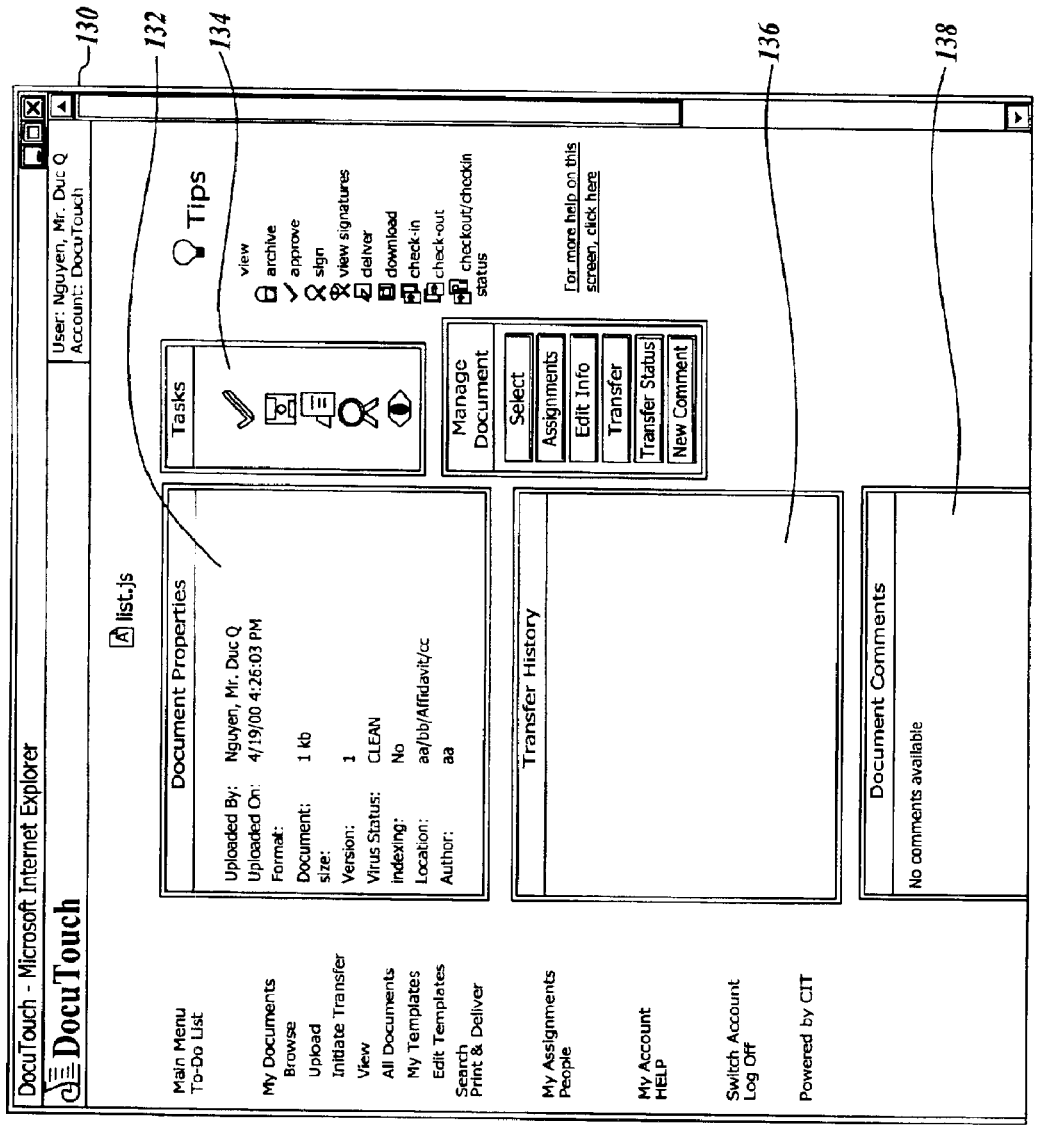

FIG. 6 illustrates a document information window 130 that presents various information about a particular document. Document information window 130 includes a document properties subwindow 132, a tasks subwindow 134, a transfer history subwindow 136, and a document comment subwindow 138. Document properties subwindow 132 displays various document properties, such as the uploader, the upload date, document format, size, etc. Tasks subwindow 134 presents icons of various tasks not yet completed for the presented document. Transfer history subwindow 136 presents the history of transfers that have occurred on this document and documents comment subwindow 138 presents any comments that have been applied to the document.

Figure 7:
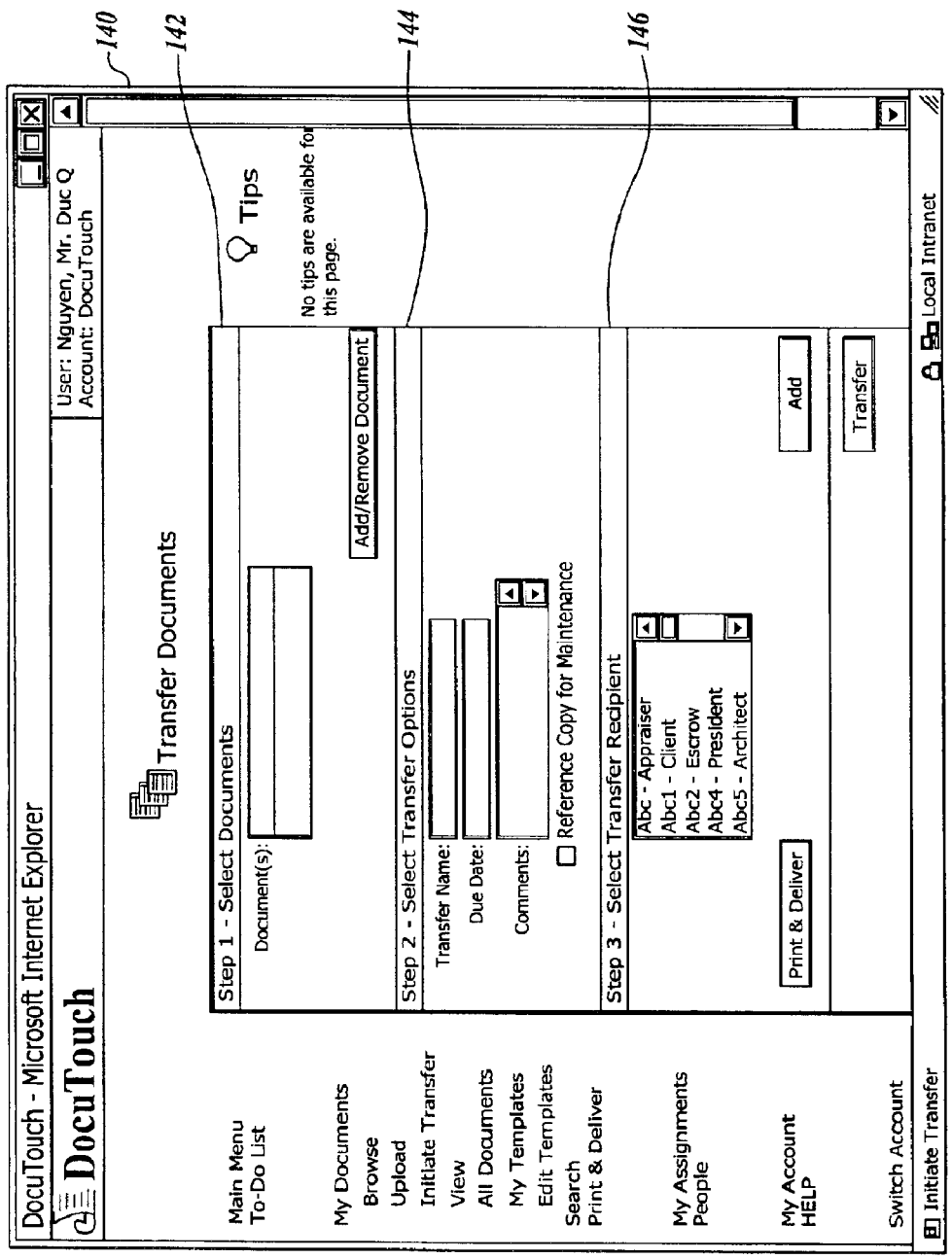

FIG. 7 illustrates a document transfer window 140 that is generated after a customer indicates a request to perform a transfer transaction. Document transfer window 140 includes a select document UI component 142, a transfer option UI component 144, and a transfer recipient designation component 146. Select document UI component 142 provides a location where the customer enters the name of a document previously stored in document system 22 that they wish to transfer. In one embodiment, in order for the customer to properly designate a document for transfer, the customer must be designated as holder in due course by information previously associated with the document. Transfer option UI component 144 allows the customer to indicate a name for the document transfer, a due date, any comments, or other information relative to the transfer transaction. Transfer recipient designation component 146 allows the customer to identify the recipient or transferee from a list of other customers or subscribers to document system 20.

Figure 8:
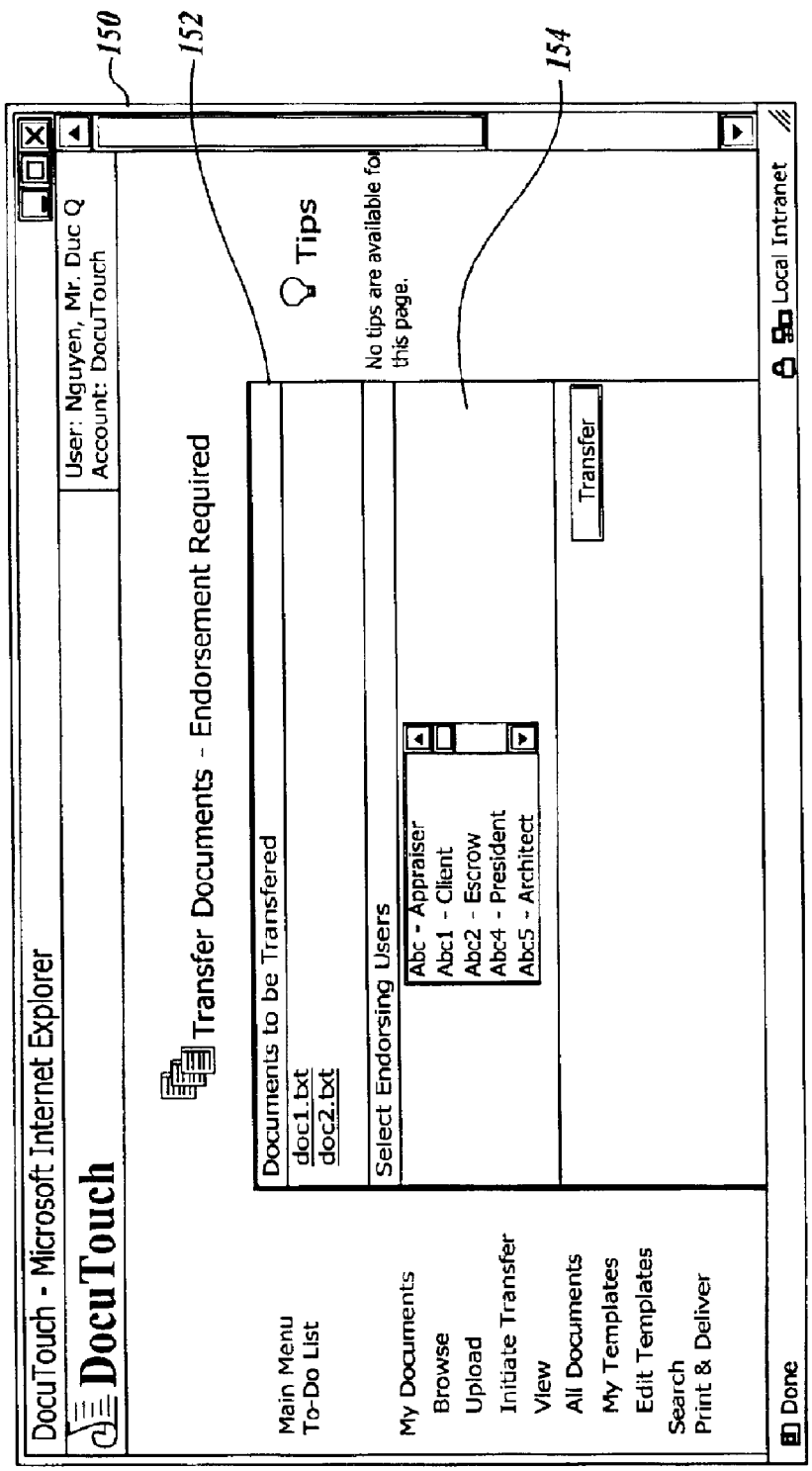

FIG. 8 illustrates an endorsement window 150 for allowing the customer to endorse a document they have designated for transfer. Endorsement window 150 includes a list 152 of documents to be transferred and an endorsing identifier UI component 154. List 152 of documents to be transferred presents the documents that were identified in document transfer window 140. Endorsing identifier UI component 154 allows the customer to apply an identifying title, such as appraiser, client, escrow, president, architect, or a manually entered title, to their endorsement.

Figure 9:
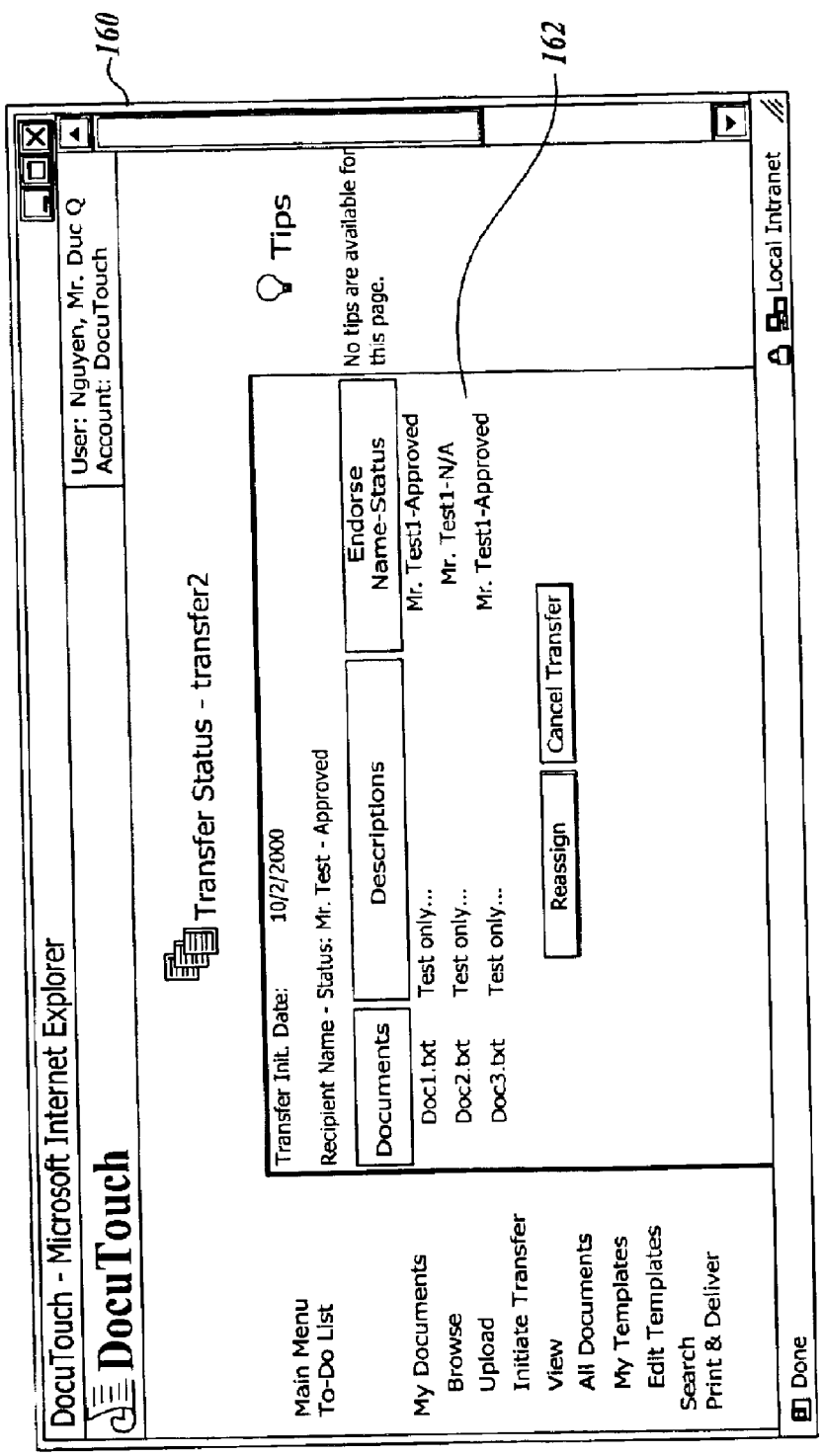

FIG. 9 illustrates a transfer status window 160 for presenting the status of transferred documents in a display area 162. Transfer status window 160 is presented preferably after the customer requests transfer status. The request for transfer status can be performed at the document transfer UI component 118 in activity window 114.

Figure 10:
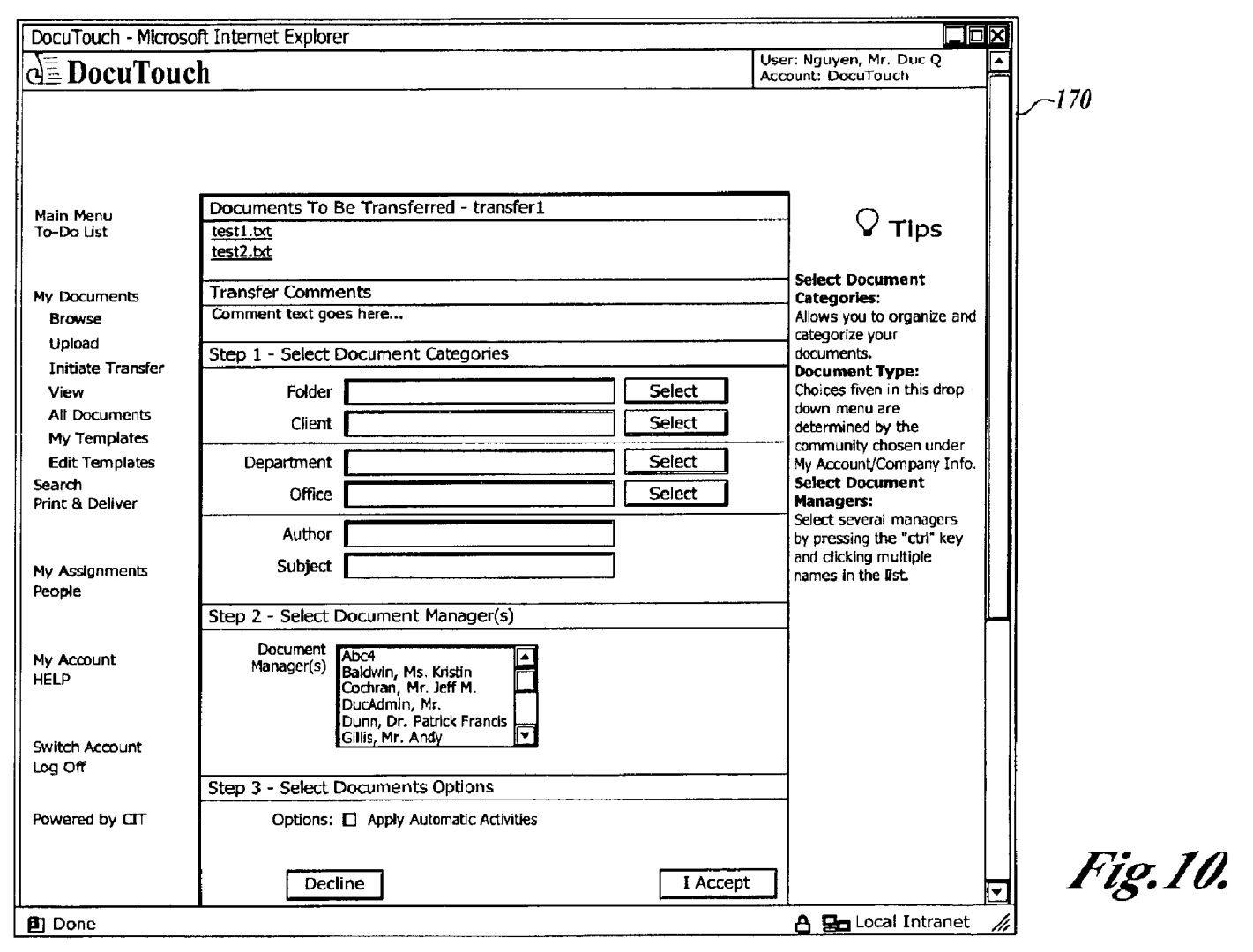

FIG. 10 illustrates an accept records window 170 that allows a customer to view transferred document information and accept or decline a transferred document. Accept records window 170 is presented preferably after the customer requests to view documents, transferred to them by another customer, that require acceptance. The customer requests to view documents transferred to them by selecting a UI command at the document transfer UI component 118 in activity window 114.

While the preferred embodiment of the invention has been illustrated and described, it will be appreciated that various changes can be made without departing from the spirit and scope of the invention. For example, various other graphical or non-graphical UIs can be used for performing the functions described above. Accordingly, the scope of the invention is not limited by the disclosure of the preferred embodiment. Instead, the scope of the invention should be determined entirely by reference to the claims that follow.

The embodiments of the invention in which an exclusive property of privilege is claimed are defined as follows:

1. A method for generating and transferring electronic documents, comprising:
   uploading and storing an electronic document to a document system from a customer system over a network;
   designating the uploaded electronic document as a single authoritative copy and as a transferable record;
   generating and storing a salt value that is associated with the uploaded electronic document;
   generating and storing a digest of the uploaded electronic document using the generated salt value; and
   identifying the holder in due course of the uploaded electronic document; and
   transferring the uploaded electronic document to a new holder in due course,
   wherein transferring comprises:
      endorsing the document by the present holder in due course to a new holder in due course;
      sending the endorsed document, the associated stored salt value, and the associated generated digest to the new holder in due course;
      verifying that the sent document is the single authoritative copy based on the associated stored salt value and the associated generate digest;
      storing a new electronic document to the document system from the new holder in due course;
      generating and storing a new salt value that is associated with the newly stored electronic document; and
      generating and storing a new digest of the newly uploaded electric document using the generated new salt value.

2. The method of claim 1, wherein transferring further comprises at the document system, flagging the stored document that was endorsed for transfer as a non-single authoritative copy.

3. The method of claim 1, wherein verifying comprises:
   generating a digest of the sent document using the sent salt value; and
   verifying that the sent document is the single authoritative copy by comparing the generated digest to the sent digest.

4. The method of claim 1, wherein the newly stored electronic document is identical to the sent document.

5. A system for generating and transferring electronic documents, comprising:
   a plurality of customer systems; and
   a document system coupled to the plurality of customer systems over a network, comprising:
      a document upload component configured to upload and store an electronic document from one of the customer systems over the network;
      an assigning component configured to designate the uploaded electronic document as a single authoritative copy and as a transferable record;
      a salting component configured to generate and store a salt value that is associated with the uploaded electronic document;
      a digesting component configured to generate and at store a digest of the uploaded electronic document using the generated salt value;
      an identifier component configured to identify the holder in due course of the uploaded electronic document; and
      a transferring component configured to transfer the uploaded electronic document to a new holder in due course,
      wherein the document system further comprises:
         an endorsing component configured to endorse the document by the present holder in due course to a new holder in due course;
         a transmission component configured to send the endorsed document, the associated stored salt value, and the associated generated digest to the new holder in due course;
         a verifying component configured to verify that the sent document is the single authoritative copy based on the associated stored salt value and the associated generated digest;
         wherein the document upload component uploads and stores a new electronic document to a document system from the new holder in due course;
         wherein the salting component generates and stores a new salt value that is associated with the newly unloaded electronic document; and
         wherein the digesting component generates and stores a new digest of the newly uploaded electronic document using the generated new salt value.

6. The system of claim 5, wherein transferring component further comprises a flag component configured to flag the stored document that at was endorsed for transfer as a non-single authoritative copy.

7. The system of claim 5, wherein the verifying component generates a digest of the sent document using the sent salt value, and verifies that the sent document is the single authoritative copy by comparing the generated digest to the sent digest.

8. The system of claim 5, wherein the newly stored electronic document is identical to the sent document.

9. A system for generating and transferring electronic documents, comprising:

a means for uploading and storing an electronic document to a document system from a customer system over a network;

a means for designating the uploaded electronic document as a single authoritative copy and as a transferable record;

a means for generating and storing a salt value that is associate with the uploaded electronic document;

a means for generating and storing a digest of the uploaded electronic document using the generated salt value;

a means for identifying the holder in due course of the uploaded electronic document; and a means for transferring the uploaded electronic document to a new holder in due course, wherein the means for transferring comprises:

a means for endorsing the document by the present holder in due course to a new holder in due course;

a means for sending the endorsed document, the associated stored salt value, and the associated generated digest to the new holder in due course;

a means for verifying that the sent document is the single authoritative copy based on the associated stored salt value and the associated generated digest;

a means for uploading and storing a new electronic document to a document system from the new holder in due course;

a means for generating and storing a new salt value that is associated with the newly uploaded electronic document; and a means for generating and storing a new digest of the newly uploaded electronic document using the generated new salt value.

10. The system of claim 9, wherein the means for transferring further comprises a means for flagging, at the document system, the stored document that was endorsed for transfer as a non-single authoritative copy.

11. The system of claim 9, wherein the means for verifying comprises:

a means for generating a digest of the sent document using the sent salt value; and a means for verifying that the sent document is the single authoritative copy by comparing the generated digest to the sent digest.

12. The system of claim 9, wherein the newly stored document is identical to the sent document.

\* \* \* \* \*